(No Model.)

E. HUMBRECHT.
VEHICLE WHEEL TIRE.

No. 576,072. Patented Jan. 26, 1897.

WITNESSES
Sherwood R. Taylor
John O. Rose

INVENTOR
Erasmus Humbrecht,
by John S. Jones
his attorney.

UNITED STATES PATENT OFFICE.

ERASMUS HUMBRECHT, OF CINCINNATI, OHIO.

VEHICLE-WHEEL TIRE.

SPECIFICATION forming part of Letters Patent No. 576,072, dated January 26, 1897.

Application filed August 15, 1896. Serial No. 602,876. (No model.)

*To all whom it may concern:*

Be it known that I, ERASMUS HUMBRECHT, a citizen of the United States, residing at Cincinnati, in the county of Hamilton and State of Ohio, have invented certain new and useful Improvements in Vehicle-Wheel Tires, of which the following is a specification.

My invention relates to vehicle-wheels, or, more particularly speaking, to cushion or resilient tires for bicycle-wheels of the class that requires no inflating with air or the like, and which are so adapted that puncture will not affect them; and my invention consists in the novel features of construction hereinafter fully described, and particularly pointed out in the claim.

Figure 1:
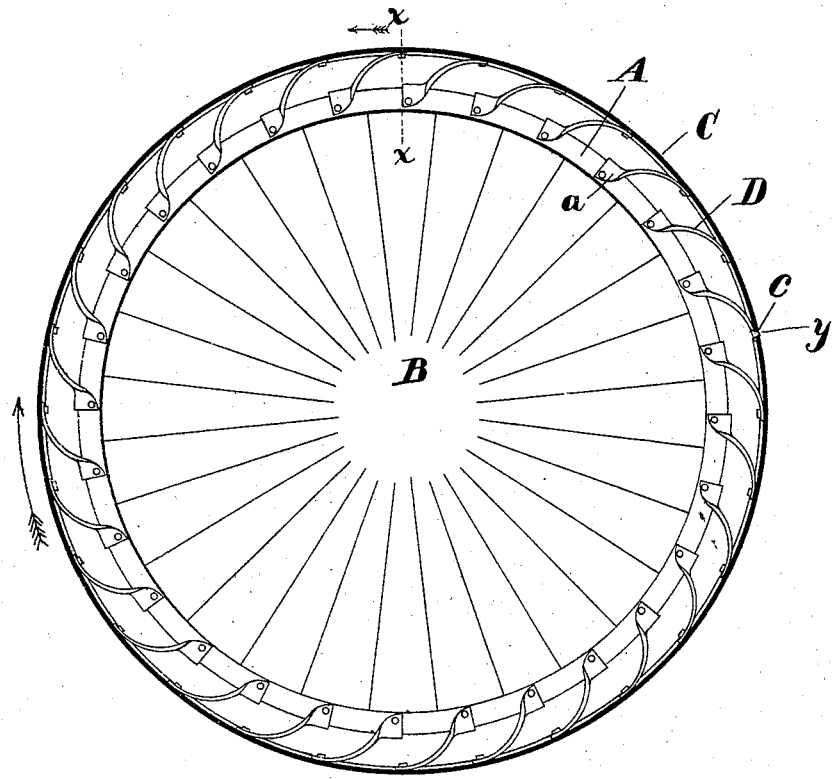
Figures 2, 3:
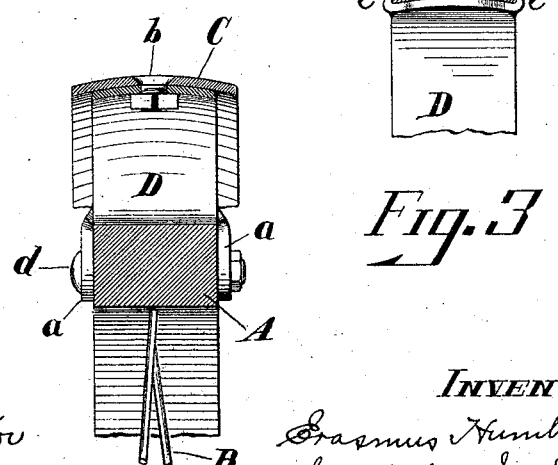

In the accompanying drawings, Figure 1 is an elevation of my improved wheel, but omitting the hub; Fig. 2, a broken transverse section taken (in the direction of the adjacent arrow) on the dotted line $x\ x$ of Fig. 1, but on a larger scale; and Fig. 3, a transverse section of the tire, showing one of my spring-cushions in connection therewith in elevation, but broken off below, the means of securing the said spring to the tire being a modified form of that seen in Fig. 2.

A represents the rim of the wheel, B its spokes, and C the tire. The rim is preferably made solid and rectangular in cross-section, whereby it is best adapted to accommodate the outer ends of the customary wire spokes and also to form a substantial bearing for the inner rocker or pivotal ends $a$ of the springs D, which are mounted in a circular series around the periphery of the rim and project tangentially therefrom in the space between said rim and tire, as best seen in Fig. 1. The outer ends of the springs D are secured to the under side of the tire.

In Fig. 2 I show the spring as being secured at its outer end to the tire by means of a short tire-bolt $b$, but in Fig. 3 (and at $y$ in Fig. 1) I show how the spring may have short ears $c\ c$ constructed near its outer ends, which ears are turned over on the edges of the tire and thereby make a more flexible means of attachment, no stiff bolting at the center being present or necessary, as in the first-named form.

It is obvious that any suitable means of securing the outer ends of the springs to the tire may be employed without affecting my invention herein, and I merely show and mention said two forms as useful and desired ones which occur to me and are applicable at the present time.

The inner ends $a$ of the springs form side ears which straddle the rim, as best seen in Fig. 2, and transverse bolts $d$ are passed through them, whereby they are pivoted to said rim.

The springs D are simply outwardly bowed or curved, arms or plates projecting from said ears $a\ a$, and are slightly hollowed or concavo-convex in cross-section to correspond with the rim, which is made likewise in cross-section and rounded on its edges for the proper lapping engagement of the fastening-ears $c\ c$.

The rim may be made of wood or any other suitable material and the tire of thin steel, india-rubber, or thick leather, as desired, but I really prefer that the tire be made of rubber, as it will then be more flexible, elastic, and resilient, and the springs will have greater cushioning effect.

The arrow to the left in Fig. 1 indicates the direction of rotation of the wheel in its advance or forward movement.

It will be seen that in operation my tire requires no air-inflation or pumping up, nor does it require any outer shoe. The parts are open to view, easily cleaned and repaired, and also readily put together and taken apart. Breaks or injuries thereto and defects therein are obviously easily detected and remedied, and in action the cushioning effect is equal to that of any pneumatic or other cushion tire. The space between the rim and tire enables the said cushioning effect, as it permits the proper working or compression of the flexible tire against the springs.

I claim—

An elastic, vehicle-wheel tire composed of a flexible outer ring C, a rigid inner rim A rectangular in cross-section, and a circumferential series of resilient spring-arms D interposed between said ring and rim tangential to the latter, each of said spring-arms having a pair of ears $a\ a$ constructed at its inner end, which ears straddle said wheel-rim A and are pivotally connected therewith, and each of said spring-arms being rigidly connected at their outer ends to the flexible ring C, substantially as herein set forth.

In testimony of which invention I have hereunto set my hand.

ERASMUS HUMBRECHT.

Witnesses:
JOHN E. JONES,
K. L. BUTLER.